United States Patent
Busboom et al.

(10) Patent No.: US 7,553,248 B2
(45) Date of Patent: Jun. 30, 2009

(54) BELT DRIVE SYSTEM INCORPORATING FIXED BRAKE MEMBER

(75) Inventors: Garry Busboom, Beatrice, NE (US); Steven C. Finkner, Adams, NE (US); Jeremy J. Tate, Beatrice, NE (US)

(73) Assignee: Exmark Manufacturing Company, Incorporated, Beatrice, NE (US)

( * ) Notice: Subject to any disclaimer, the term of this patent is extended or adjusted under 35 U.S.C. 154(b) by 282 days.

(21) Appl. No.: 11/231,953

(22) Filed: Sep. 21, 2005

(65) Prior Publication Data
US 2007/0062169 A1  Mar. 22, 2007

(51) Int. Cl.
*F16H 7/12* (2006.01)
(52) U.S. Cl. ........................................ 474/134
(58) Field of Classification Search ............... 56/11.3, 56/11.4, 11.6; 192/224.1; 474/134, 133, 474/135, 101, 117, 138, 109; 188/259, 77 W, 188/82.6
See application file for complete search history.

(56) References Cited

U.S. PATENT DOCUMENTS

| | | | |
|---|---|---|---|
| 2,718,154 A | | 9/1955 | Mathson |
| 3,367,459 A | * | 2/1968 | Rubin ..................... 192/224.1 |
| 3,570,637 A | * | 3/1971 | Pitman et al. ............ 192/224.1 |
| 4,048,787 A | | 9/1977 | Harkness et al. |
| 4,058,957 A | | 11/1977 | Roseberry |
| 4,108,292 A | * | 8/1978 | Takano .................... 192/224.1 |
| 4,150,928 A | | 4/1979 | Regan et al. |
| 4,307,558 A | * | 12/1981 | Bent et al. ................... 56/11.3 |
| 4,310,082 A | | 1/1982 | Elmy et al. |
| 4,409,779 A | | 10/1983 | Bent et al. |
| 4,551,120 A | * | 11/1985 | Thomey ..................... 474/135 |
| 4,813,215 A | | 3/1989 | Chase et al. |
| 4,934,989 A | * | 6/1990 | Furukawa et al. ........... 474/135 |
| 4,996,829 A | * | 3/1991 | Saitoh et al. .................. 56/13.3 |
| 5,146,735 A | | 9/1992 | McDonner |
| 5,155,985 A | | 10/1992 | Oshima et al. |
| 5,526,635 A | | 6/1996 | Wilder, Jr. |
| 5,647,813 A | | 7/1997 | Serkh |
| 5,769,747 A | * | 6/1998 | Kuhn et al. .................. 474/135 |
| 5,797,251 A | | 8/1998 | Busboom |
| 6,073,430 A | * | 6/2000 | Mullet et al. ................. 56/13.4 |
| 6,085,502 A | * | 7/2000 | Wians et al. ................. 56/11.3 |

(Continued)

OTHER PUBLICATIONS

U.S. Appl. No. 10/933,685, filed Sep. 3, 2004, Davis et al.

(Continued)

*Primary Examiner*—Árpád Fábián-Kovács
(74) *Attorney, Agent, or Firm*—Mueting, Raasch & Gebhardt, P.A.

(57) ABSTRACT

A drive system for use with an endless drive member, e.g., a belt. The drive system may utilize an idler pulley that, in a first position, tensions the belt sufficiently to ensure power transmission between a driving pulley and a driven pulley. The idler pulley may be also be moved to a second position. In the second position, the idler pulley may both: relax tension in the belt to terminate power transmission to the driven pulley; and contact a brake member to quickly stop idler pulley rotation. Belt tension may then stop rotation of downstream driven pulleys. As a result, disengagement of the drive system and active braking of the idler pulley (and thus the driven pulleys) may both be accomplished via a single motion of the idler pulley.

16 Claims, 5 Drawing Sheets

U.S. PATENT DOCUMENTS

| | | | |
|---|---|---|---|
| 6,199,354 B1* | 3/2001 | King et al. | 56/11.3 |
| 6,602,155 B2* | 8/2003 | Buss et al. | 474/135 |
| 2006/0052193 A1* | 3/2006 | Davis et al. | 474/109 |

OTHER PUBLICATIONS

"Metro® Operator's Manual," *Exmark® Mfg. Co. Inc.*, Part No. 103-2989, 2002.

"Metro® Parts Manual," *Exmark® Mfg. Co. Inc.*, Part No. 103-3635, 2002.

"Turf Tracer® HP Operator's Manual,"*Exmark® Mfg. Co. Inc.*, Part No. 103-1243, 2001.

"Turf Tracer® HP Parts Manual,"*Exmark® Mfg. Co. Inc.*, Part No. 103-1244, 2001.

\* cited by examiner

BELT DRIVE SYSTEM INCORPORATING FIXED BRAKE MEMBER

TECHNICAL FIELD

The present invention relates generally to power equipment and, more particularly, to braked belt drive systems such as those found on ground maintenance vehicles, e.g., lawn mowers or the like.

BACKGROUND

Ground maintenance vehicles adapted to support and operate any one of a number of ground-engaging implements are known. For instance, tractors may support such implements as cutting decks, snow throwers, sweepers, etc. While some of these implements may be self-powered (e.g., tow-behind cutting decks having on-board engines), most implements typically receive take-off power from a driveshaft of the vehicle's engine. While the present invention is applicable to drive systems for use with most any type of power equipment and implement combination, it will, for the sake of brevity, be described with respect to a commercial riding mower having a belly-mounted or front-mounted cutting deck.

For mowers having large engines, e.g., 20 horsepower or more, the engine may be mounted such that the engine output shaft (driveshaft) protrudes horizontally from a rear side of the engine. Similarly, a jackshaft, which receives power from the driveshaft, may be coupled to the cutting deck. In many configurations, power is provided from the drive shaft to the jackshaft via a belt drive system.

Belt drive systems found on riding lawn mowers typically include an endless belt extending between a pulley attached to the driveshaft, and a pulley attached to the jackshaft. An idler pulley may be used to selectively tension the belt and deliver power from the driveshaft to the jackshaft of the cutting deck. To disengage power to the cutting deck, the idler pulley may be moved away from the belt until belt tension is sufficiently relaxed.

While effective at terminating delivery of power to the cutting deck, system inertia may result in rotation of the cutting blades even after power delivery is stopped. As a result, it is sometimes desirable to brake the drive system so that the cutting blades are stopped more quickly. This is typically accomplished by a separate brake element that may be selectively positioned in contact with a moving component of the cutting deck system. For example, some mowers utilize an independently actuatable band brake that can be applied to a spindle or pulley mounted to (or otherwise associated with) the cutting deck.

While such brake systems are able to stop the cutting blades quickly, problems remain. For example, the movement of both the idler pulley and the brake element generally requires a sophisticated mechanism (or two separate mechanisms). As a result, these brake systems may increase complexity (and ultimately, cost) of the drive system and, consequently, the mower.

SUMMARY

The present invention provides a drive system that minimized and/or avoids these and other problems.

In one embodiment of the present invention, a drive system is provided that includes a driving pulley; a driven pulley; and an endless belt partially surrounding both the driving pulley and the driven pulley. An idler pulley located proximate the belt between the driving pulley and the driven pulley is also provided. The idler pulley is selectively movable between: a first position, wherein the idler pulley contacts the belt and tensions it sufficiently to ensure power transmission between the driving pulley and the driven pulley; and a second position, wherein the idler pulley both relaxes the belt and contacts a stationary brake member.

In another embodiment, a drive system for use with a vehicle is provided. The drive system includes a powered driving pulley; at least one driven pulley operatively attached to an implement supported by the vehicle; and an endless belt operable to contact portions of both the driving pulley and the at least one driven pulley. An idler pulley is also provided and positioned proximate the belt. The idler pulley is selectively movable between a first position and a second position, wherein, when in the first position, the idler pulley tensions the belt to ensure transmission of power between the driving pulley and the at least one driven pulley, and, when in the second position, both relaxes the belt and frictionally contacts a stationary brake member.

In yet another embodiment, a drive system for use with a lawn mower is provided. The system includes: a driving pulley coupled to an engine; a driven pulley coupled to a jackshaft; and at least one endless belt operable to contact both the driving pulley and the driven pulley. An idler pulley is also provided and located between the driving pulley and the driven pulley. The idler pulley is selectively movable between: a first position, wherein the idler pulley contacts and tensions the at least one endless belt; and a second position, wherein the idler pulley moves away from the at least one endless belt and contacts a stationary band brake.

The above summary is not intended to describe each embodiment or every implementation of the present invention. Rather, a more complete understanding of the invention will become apparent and appreciated by reference to the following Detailed Description of Exemplary Embodiments and claims in view of the accompanying figures of the drawing.

BRIEF DESCRIPTION OF THE VIEWS OF THE DRAWING

The present invention will be further described with reference to the figures of the drawing, wherein:

FIG. 3 is a diagrammatic rear elevation view of the drive system of FIG. 1, wherein the drive system is shown in a first operating configuration;

Unless stated otherwise herein, the figures of the drawing are rendered primarily for clarity and thus may not be drawn to scale. Moreover, in some figures, certain structure may be removed to improve clarity.

DETAILED DESCRIPTION OF EXEMPLARY EMBODIMENTS

In the following detailed description of illustrative embodiments of the invention, reference is made to the accompanying figures of the drawing that form a part hereof, and in which are shown, by way of illustration, specific embodiments in which the invention may be practiced. It is to be understood that other embodiments may be utilized and structural changes may be made without departing from the scope of the invention.

Generally speaking, the present invention is directed to a drive system for use in transmitting power from a driving shaft to one or more driven shafts. While other configurations are certainly possible, one exemplary application of the invention is to belt drive systems.

Figure 1:
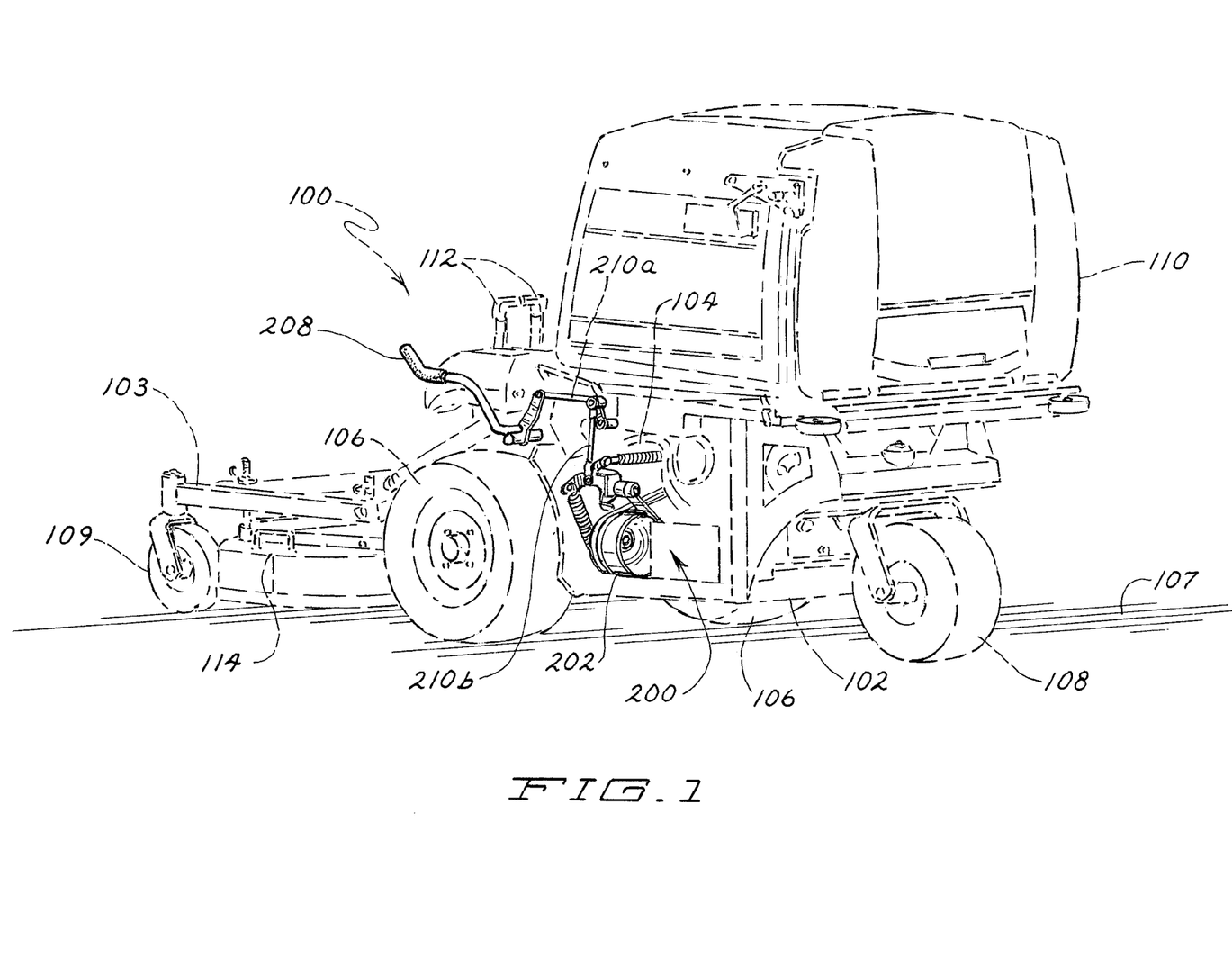
FIG. 1 is a perspective view of a vehicle, e.g., riding lawn mower, incorporating a drive system in accordance with one embodiment of the present invention.

FIG. 1 illustrates a belt drive system 200 in accordance with one embodiment of the present invention as it may be incorporated on a vehicle, e.g., a power lawn mower 100. While described with respect to a particular power lawn mower (hereinafter generically referred to as a "mower"), those of skill in the art will realize that the invention is equally applicable to most any type of powered riding or walk-behind mower, as well as to most any other powered ground-working vehicle (e.g., skid-steer loader, agricultural mower, aerator, snow thrower, tiller, etc.). The invention may also find application to most any other type of power equipment and drive system that utilizes an idler-type engagement component.

FIG. 1 illustrates the exemplary mower 100 (shown primarily in broken lines) having underlying structure (a frame 102) that supports a prime mover, e.g., internal combustion engine 104. A pair of transversely opposing, ground engaging drive wheels 106 may support the mower 100 in rolling engagement with a ground surface 107. A castoring (or steerable) trailing rear wheel 108 may support a rear portion of the mower in a tricycle-type configuration. Each drive wheel 106 may be powered by a hydraulic motor (not shown) which receives power from a hydraulic pump under the control of the operator. The hydraulic pumps, in turn, may be powered by the engine 104. Other wheel drive systems (e.g., mechanical systems) are also possible without departing from the scope of the invention.

An implement, e.g., cutting deck 114, may be mounted to a lower side of a support frame 103 that is attached generally forward of the drive wheels 106, yielding what is commonly referred to as an "out-front" mower configuration. The cutting deck 114 may include one or more cutting blades (not shown) as is known in the art. During operation, power is selectively delivered to the blades of the cutting deck 114 by the engine, whereby the blades rotate at a speed sufficient to sever grass and other vegetation over which the deck passes. A pair of front caster wheels 109, which connect to forwardly extending portions of the support frame 103, may support the cutting deck in rolling engagement with the ground surface 107.

An optional grass catcher 110 may also be provided to collect grass clippings. Typically, a powered blower (not shown) is provided to transport the clippings from a rear or side discharge port on the cutting deck 114 to the catcher 110.

The mower 100 may be operated by an operator, sitting in an operator seat (not shown), via manipulation of various controls (e.g., drive control levers 112) as is known in the art.

As used herein, relative terms such as "left," "right," "fore," "forward," "aft," "rearward," "top," "bottom," "upper," "lower," "horizontal," "vertical," and the like are, if used, from the perspective of one operating the mower 100 while the mower is in an operating configuration, e.g., while the mower 100 is positioned such that the wheels 106, 108, and 109 rest upon the generally horizontal ground surface 107 as shown in FIG. 1. These terms are used herein only to simplify the description, however, and not to limit the scope of the invention in any way.

It is further noted that the terms "comprises" and variations thereof, as used herein, do not have a limiting meaning where these terms appear in the description and claims. Moreover, "a," "an," "the," "at least one," and "one or more" are used interchangeably herein.

Figure 2:
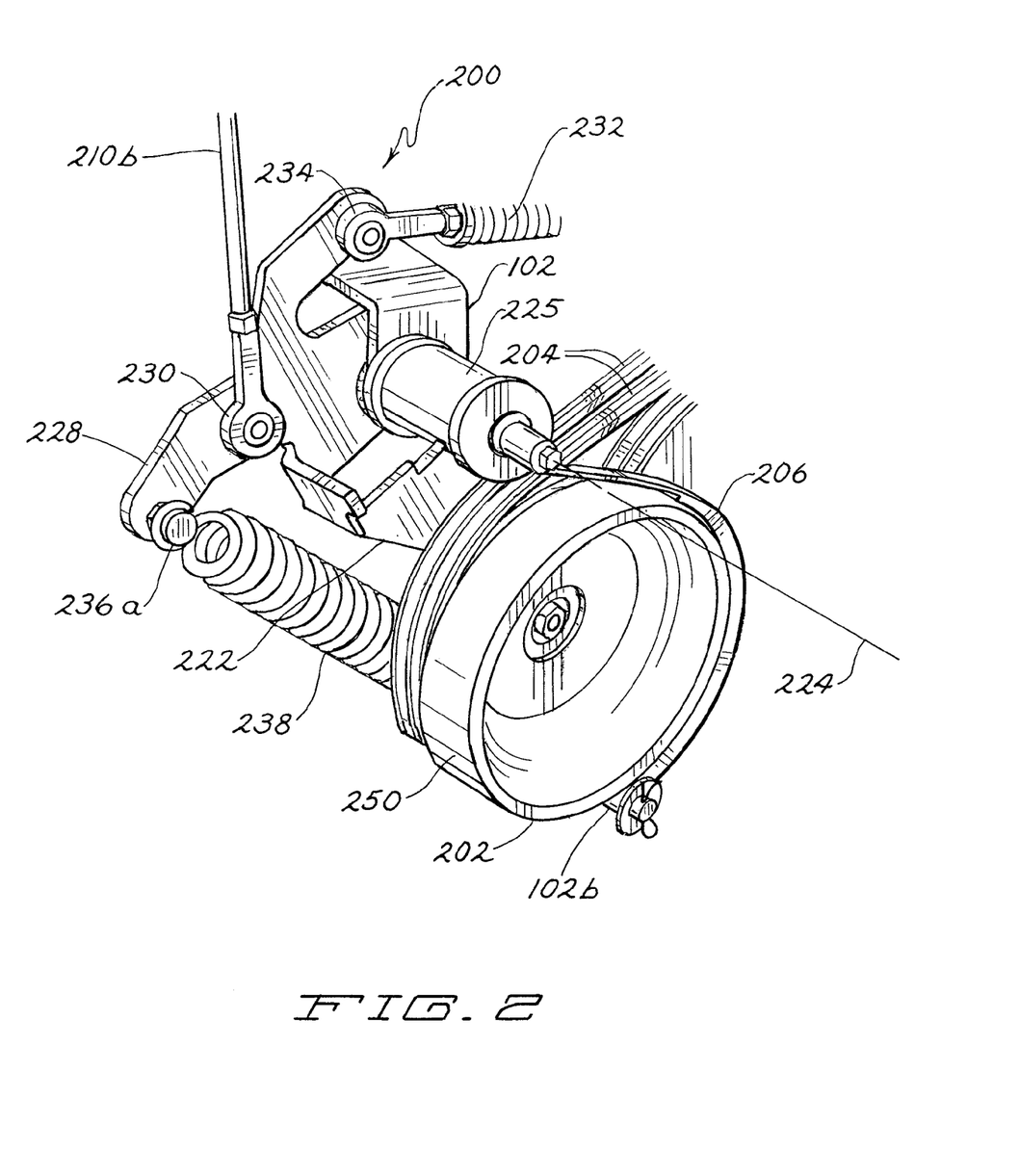
FIG. 2 is an enlarged perspective view of a portion of the drive system of FIG. 1.

FIG. 2 is an enlarged partial perspective view of a portion of the drive system 200 of FIG. 1. In this view, an idler sheave or pulley 202 is clearly visible. The idler pulley 202 may selectively tension two endless belts 204. In the illustrated embodiment, two belts are used to permit increased power transmission within a limited belt routing envelope. However, more (or less) belts may be utilized without departing from the scope of the invention.

The system may also include a substantially stationary brake member, e.g., band brake 206, which, as described below, may be used to apply a braking force to the idler pulley 204. The system 200 may be controlled and actuated via a mechanical linkage controlled by a lever 208 (see FIG. 1) that is positioned in reach of the operator while sitting on the mower 100. The lever 208 allows positioning of the idler pulley 202 via a series of links 210 (see, e.g., link 210a in FIG. 1 and link 210b in FIGS. 1 and 2) and pivoting members as described in more detail below.

FIG. 3 illustrates a diagrammatic rear elevation view of the drive system 200 with some mower structure removed for clarity. In this embodiment, the driveshaft 212 of the engine 104 is coupled to a driving pulley 214. The powered driving pulley 214 may provide power to one or both of a first jackshaft 215 (via a first driven pulley 216) and a second jackshaft 217 (via a second driven pulley 218) through the belt(s) 204. The first jackshaft 215 may be coupled to a blower (diagrammatically represented as 211 in FIG. 3) used to transport clippings from the deck 114 to the catcher 110 (see FIG. 1), while the second jackshaft 217 may be coupled to a deck drive system (diagrammatically represented as 213) operable to power the cutting deck 114. Other configurations may provide more (or less) jackshafts, and may further utilize jackshafts that drive a variety of other implements, e.g., sweepers, snow-throwers, vacuums, etc.

FIG. 3 illustrates the drive system in a first operating configuration. That is, the idler pulley 202 is located in a first position such that it contacts and applies sufficient tension to the drive belt(s) 204 to ensure power transmission between the powered driving pulley 214 (driveshaft 212) and the driven pulleys 216 and 218 (jackshafts 215, 217). In the illustrated embodiment, the belts 204 may be double-sided V-belts, meaning that they may have a V profile on both sides of the belt and may be installed with either of the two profiles in contact with the pulley grooves. Preferably, each belt is substantially similar in length to permit desirable power transmission in the illustrated tandem (side-by-side) belt arrangement (see FIG. 2). However, while described as tandem double-sided V belts, other belt configurations (e.g., standard V-belts, other configurations using more or less belts) are certainly possible without departing from the scope of the invention.

Figure 4:
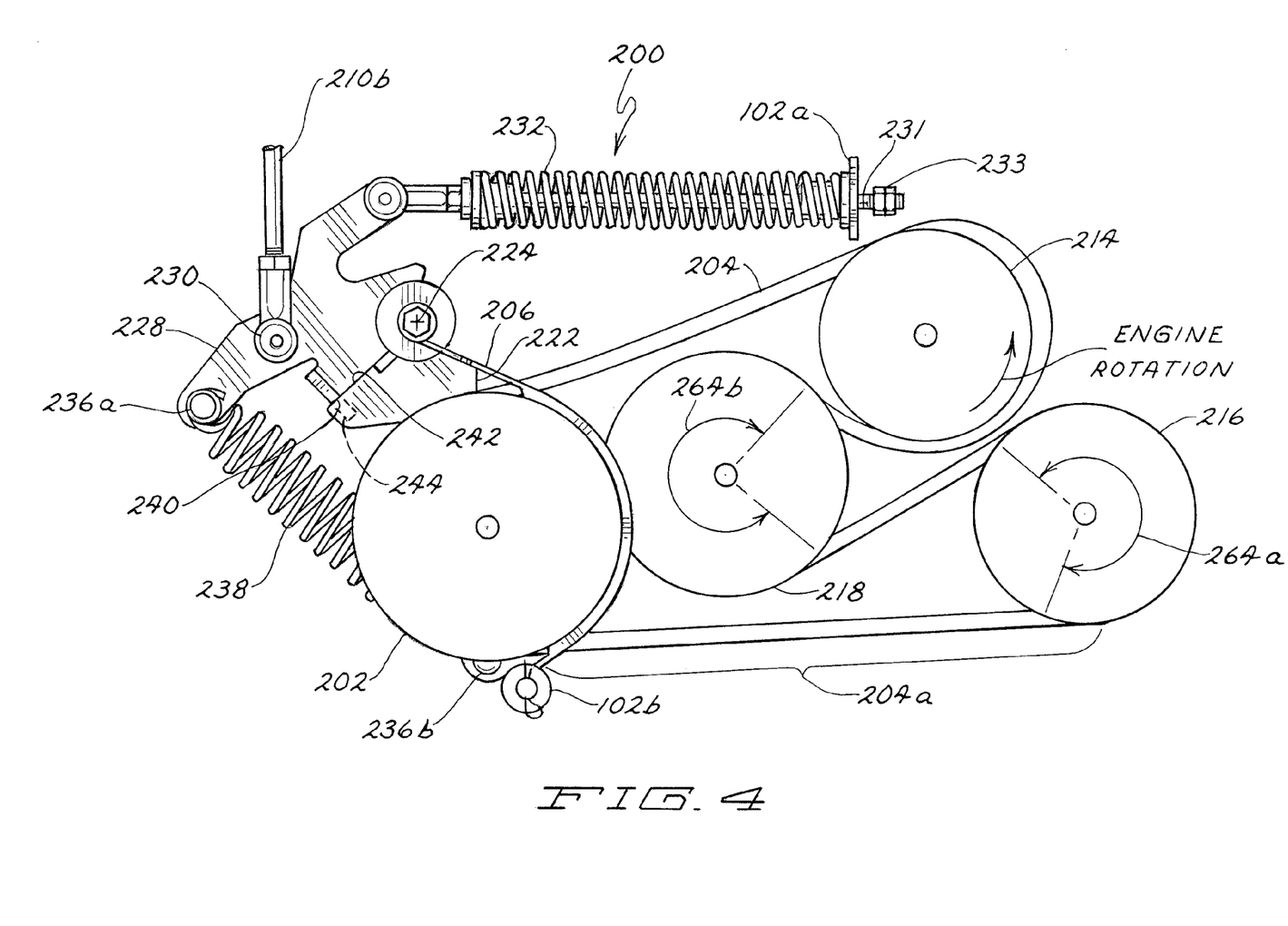
FIG. 4 is a diagrammatic rear elevation view of the drive system of FIG. 1, wherein the drive system is shown in a second braked configuration.

FIG. 4, on the other hand, illustrates the drive system 200 in a second braked configuration. That is, the idler pulley 202 is located in a second position such that it not only relaxes tension on the belt(s) 204 (between the driving pulley 214 and the idler pulley 202) sufficiently to terminate power transmission, but also directly contacts the band brake 206. In this second configuration, inertial movement of the driven pulleys 216 and 218 is resisted by the resulting tension in the drive belt(s) 204 between the idler pulley 202 and the first driven pulley 216 (in the area 204a). That is, the braked idler pulley 202 tensions the downstream portion of the belt sufficiently to brake both driven pulleys 216 and 218. Accordingly, the driven pulleys 216 and 218 (and their associated implements) may be stopped quickly, e.g., within seven seconds, and preferably within 4 seconds, of idler disengagement and braking.

In the illustrated embodiments, the idler is positioned on a slack side of the belts. The phrase "slack side" generally refers to the portion of a belt that is under less tension from the driving pulley 214, e.g., that portion of the belt that is immediately downstream from the driving pulley.

With this brief introduction, the components of the exemplary drive system 200 are now described. As shown in FIG. 3, the idler pulley 202 may be attached to an idler arm 222 that is pivotable about an idler pivot axis 224. In some embodiments, the idler arm may include an idler arm pivot joint 225 constructed in a manner similar to that described in U.S. patent application Ser. No. 10/933,685 to Davis, et al., filed 3 Sep. 2004. However, other pivot configurations as known in the art are also possible without departing from the scope of the invention. The idler pulley 202 may attach to the idler arm 222 via a journalled spindle 226 that permits free rotation of the idler pulley relative thereto.

A spring arm 228, which is mounted for independent pivotal motion about the idler pivot axis 224, may also be provided. In the illustrated embodiment, the spring arm 228 may attach to the link 210b, via a spherical pivot 230. The link 210b is operable to displace the spring arm 228, and thus actuate the drive system 200, when the handle 208 (see FIG. 1) is manipulated as further described below. The spherical pivot 230 (as well as the other spherical pivot connections described herein) permits pivotal attachment of components, as well as out-of-plane relative motion, as is known in the art.

A tie rod 231 may also attach, via a spherical pivot 234, to the spring arm 228. The tie rod 231 extends through a compression spring 232 used to bias the idler pulley 202 towards the band brake 206 when the drive system 200 is in the second braked configuration of FIG. 4. The force of the compression spring 232 may be reacted by structure 102a rigidly attached to the frame 102. In the illustrated embodiment, the tie rod 231 may extend through an opening in the structure 102a. As a result, as the tie rod 231 is displaced towards the right in FIG. 3, it may extend through the structure 102a as the spring 232 is further compressed. The end of the tie rod 231 may include jam nuts 233 that are typically removed during installation/repair of the drive system 200.

The spring arm 228 may also include a pin 236a for receiving an extension spring 238. An opposite end of the extension spring 238 may attach to a pin 236b (partially illustrated in FIG. 3) on the idler arm 222. The extension spring 238 may provide a biasing force to the idler pulley 202 when the drive system 200 is in the first operating configuration (see FIG. 3), i.e., a force that biases the idler pulley to tension the belt(s) 204.

The spring arm 228 may also include a first contact surface 240 operable to contact a second contact surface 242 of the idler arm 222 when the drive system 200 is in the second braked configuration of FIG. 4 as further described below. Indicia 244 may be provided on a portion of the spring arm 228 (or, alternatively, on the idler arm 222) to permit adjustment of the gap between the spring arm and the idler arm as shown in FIG. 3).

The band brake 206 may be attached at its lower end to mower structure 102b (e.g., to the frame 102). Similarly, a first or upper end of the band brake 206 may be attached to mower structure (e.g., to the frame 102) at, for example, the idler pivot axis 224. While attachment at the idler pivot axis is convenient due to the presence of a pivot fastener, other embodiments may attach the first end of the band brake 206 at most any location that provides acceptable engagement of the band brake with the idler pulley 202, e.g., to the spring arm 228 or the idler arm 222.

In the illustrated embodiment, the band brake 206 may be, once installed, generally fixed in place. However, the attachment points may allow some minimal movement of the brake 206 to ensure adequate contact with the idler pulley 202 during operation. The band brake 206 preferably includes a braking surface 248 (see FIG. 3) that generally corresponds in shape to a friction surface 250 of the idler pulley 202 (see FIGS. 2 and 3). In the illustrated embodiment (see FIG. 2), the friction surface 250 is of a larger diameter than that of the belt engagement surfaces. Such a configuration may provide various benefits, including, for example, increased braking force for a given engagement force of the actuation lever 208.

Figure 5:
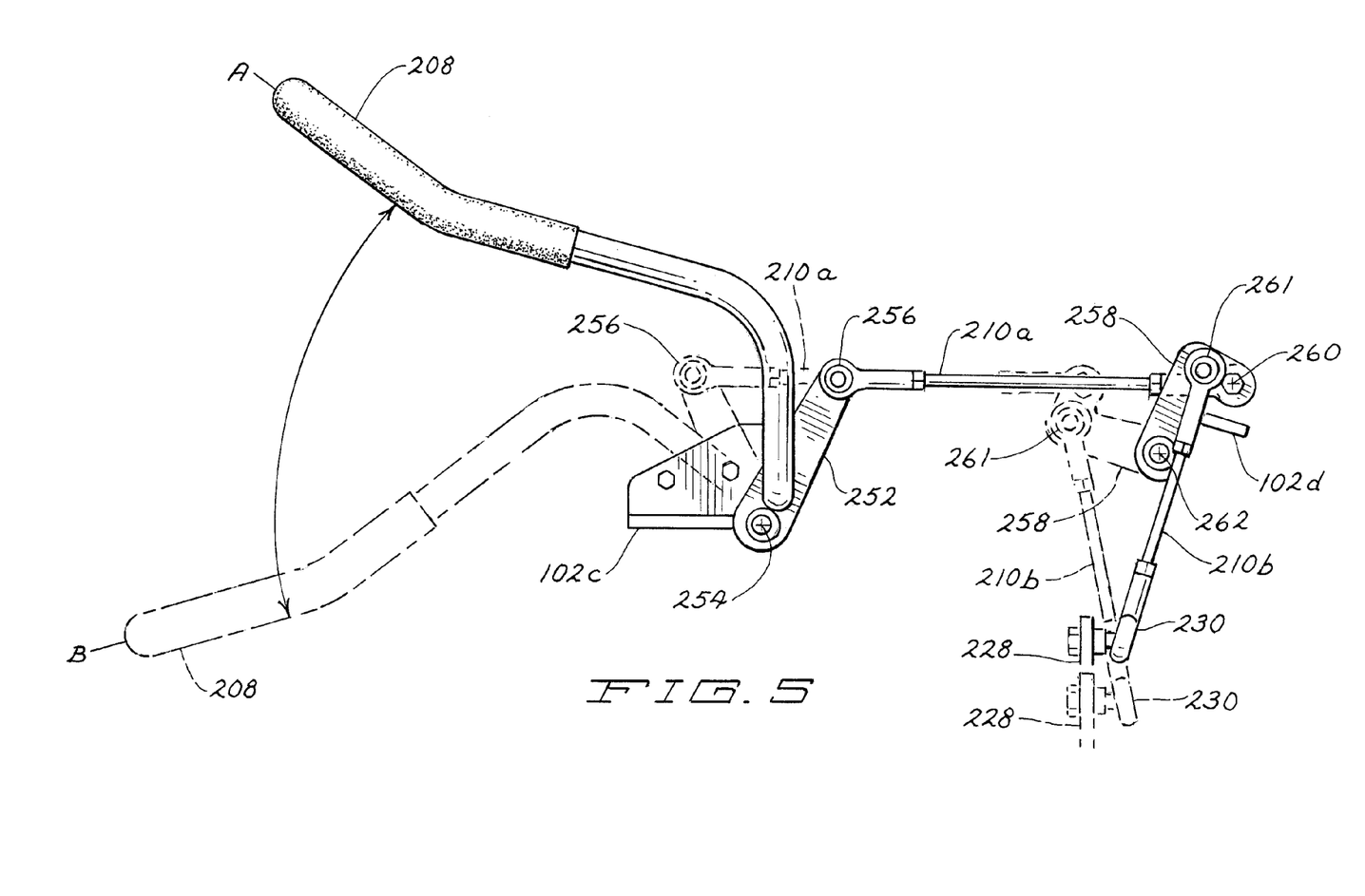
FIG. 5 is an enlarged side elevation view of an actuation lever in accordance with one embodiment of the invention, the lever operable to control the drive system of FIG. 1.
Figure 9:
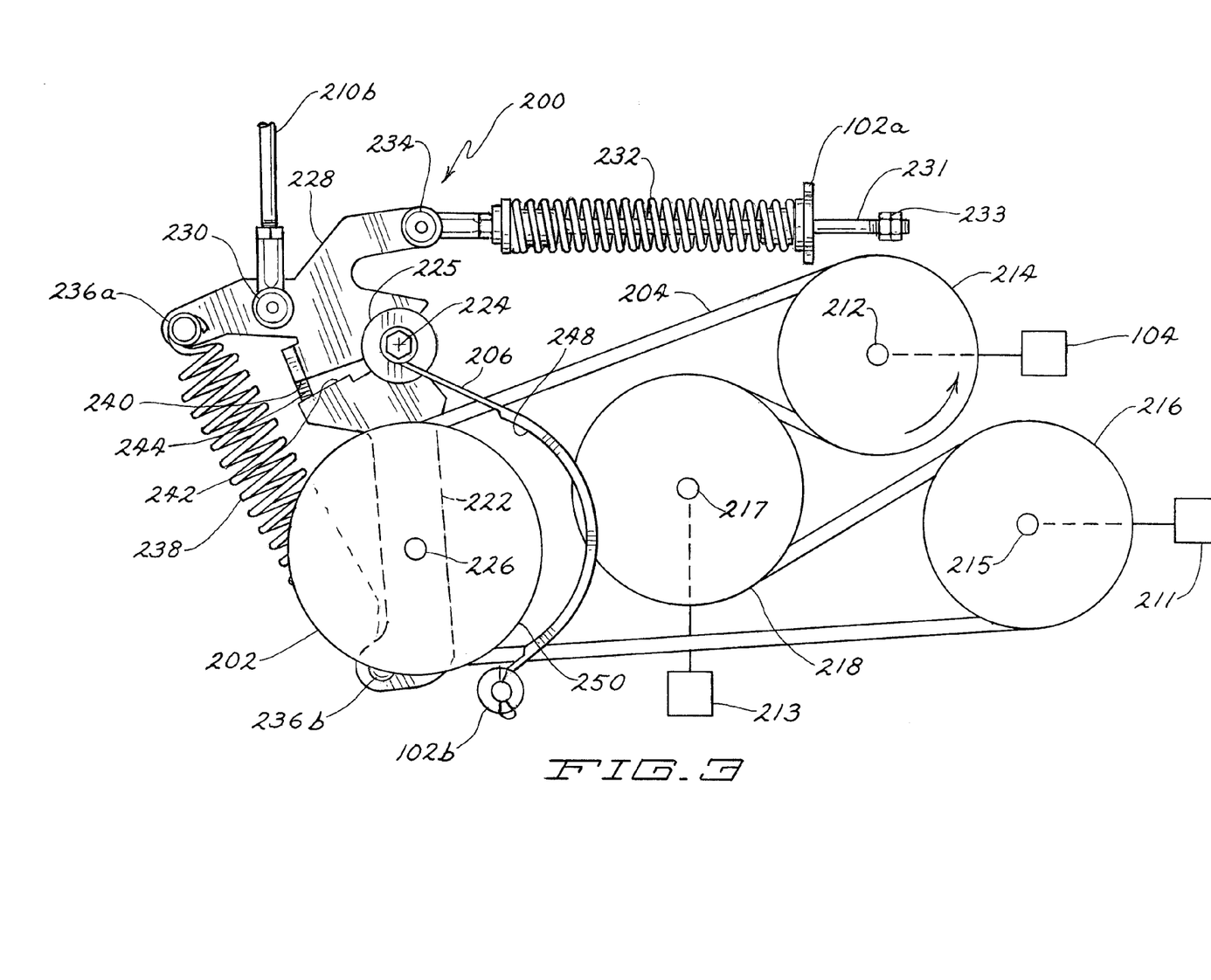

FIG. 5 is an enlarged view of the actuation lever 208 of FIG. 1. The lever 208 is preferably movable by the operator between a first position "A" and a second position "B." The first position A corresponds to the drive system 200 being in the first operating configuration of FIG. 3, while the second position B corresponds to the drive system being in the second braked configuration of FIG. 4.

The lever 208 includes (e.g., is welded to) a lever arm 252 that pivotally attaches to mower structure 102c (e.g., to the mower frame 102) such that the lever may pivot about a horizontal pivot axis 254. A distal end of the lever arm 252 may pivotally support a forward end of the link 210a via a spherical pivot 256, while the rearward end of the link 210a pivotally connects to a bellcrank 258 via a spherical pivot (not visible in FIG. 5 due to the presence of the bellcrank in the foreground) that pivots about a pivot axis 260. The bellcrank 258 may, in turn, pivotally attach to structure, e.g., to the mower frame 102, and pivot about a pivot axis 262. An upper end of the link 210b may attach to the bellcrank 258 via a spherical pivot 261, while its lower end attaches to the spring arm 228 as already described herein.

In operation, the operator may manipulate the lever 208 between positions A and B of FIG. 5 to achieve engagement and disengagement/braking of the drive system 200. For example, during mower transport, the lever 208 may be in the B position illustrated in FIG. 5. As described above, when the lever 208 is in this position, the drive system 200 is in the second braked configuration as generally illustrated in FIG. 4. The compression spring 232 may be selected and initially adjusted to ensure that it provides a sufficient biasing force to the spring arm 228/idler arm 222 to keep the idler pulley 202 in frictional engagement with the band brake 206.

Upon reaching an area to be mowed, the operator may grasp the lever 208 and manually move it from position B towards position A (see FIG. 5). This action results in movement of the link 210a in a rearward direction, thereby pivoting the bellcrank 258 in a clockwise direction and lifting the link 210b. Once the lever 208 reaches the A position, the bellcrank 258 goes over-center and contacts a hard stop 102d, effectively securing the link 210b in the position illustrated in solid lines in FIG. 5.

As the link 210b moves towards position A, it causes the spring arm 228 to pivot about the idler pivot axis 224 in a clockwise direction (e.g., from the position shown in FIG. 4 towards the position shown in FIG. 3). This motion also causes the spring arm 222, and thus the idler pulley 202, to first separate from the band brake 206. Further motion results in tightening of the belt(s) 204, initiating power transmission to the attached implements via the driven pulleys 216 and 218. Prior to the lever 208 reaching position A shown in FIG. 5, the contact surfaces 240 and 242 may separate as illustrated in FIG. 3. Once the lever 208 goes over-center into position A as illustrated in FIG. 5, the idler pulley 202 is preferably positioned to provide sufficient tension in the belt(s) 204, via the spring 238, to ensure efficient power transmission to the driven pulleys 216 and 218. The actual tension applied by the extension spring 238 may be set at belt installation/replacement by lengthening or shortening the link 210b, e.g., by adjusting the spherical pivots 230 and 261 (which may each use opposing, e.g., right-handed versus left-handed, threads).

During movement of the spring arm 228 in the clockwise direction (as viewed in FIGS. 3 and 4), the tie rod 231 is pushed towards the opposite side of the mower (to the right in FIG. 3). As this occurs, the spring 232 is further compressed against the frame structure 102a.

When the mowing operation is complete, the lever 208 may be returned from the A position to the B position (see FIG. 5). This action results in movement of the bellcrank 258 in a counterclockwise direction (as viewed in FIG. 5), which effectively moves the linkage 210b in a downward direction as shown in FIG. 4 (movement in this direction is assisted by the compression spring 232). As the link 210b moves downwardly, the spring arm 228 pivots about the idler pivot axis 224 in a counterclockwise direction (e.g., from the position shown in FIG. 3 towards the position shown in FIG. 4). During this process, the spring arm 228 may pivot until the contact surface 240 abuts the contact surface 242. Further movement of the spring arm 228 thus results in corresponding counterclockwise movement of the idler arm 222. As the idler arm 222 (and thus the idler pulley 202) move, tension in the belt(s) 204 relaxes and power transmission to the driven pulleys 216 and 218 diminishes. When the lever 208 reaches position B (see FIG. 5), the idler pulley 202 contacts the band brake 206.

The compression spring 232 acts to urge the idler pulley 202 into contact with the band brake 206 with sufficient force to brake the idler pulley's rotation. As the driven pulleys 216 and 218 attempt to further rotate (due to system inertia), friction between the belt(s) 204 and the driven pulleys 216, 218 causes the belt(s) to tighten in the area 204a (see FIG. 4) due to the braked idler pulley 202. As a result, the belt(s) 204 produce a downstream braking effect, essentially stopping the driven pulleys from continued rotation.

Braking effectiveness may be attributable to many factors. For example, inertia of the mower jackshaft (which is further downstream on the belt drive system than the blower jackshaft) tends to be of higher magnitude than that of the blower jackshaft. Thus, the belt(s) tend to tighten across both driven pulleys 216, 218 (e.g., all the way from the idler pulley 202 to the driven pulley 218). Tensioning of this portion of the belt(s) 204 also causes belt slack to accumulate downstream of the last driven pulley 218, i.e., near the driving pulley 214. Thus, the belt(s) 204 do not interfere with the rotation of the driving pulley 214 when the drive system 200 is disengaged. (as shown in FIG. 4).

The ability to brake the system may also be somewhat augmented by relatively large arcs of engagement of the belt(s) 204 with the various pulleys. For example, an arc of engagement 264a (see FIG. 4) of the belt(s) 204 with the first driven pulley 216 is greater than about 180 degrees, e.g., about 207 degrees. This configuration provides substantial frictional area over which the belt may interact with the driven pulley to provide the desired braking effect. As illustrated in FIG. 4, an arc of engagement 264b of the belt(s) 204 with the second driven pulley 218 may also be greater than about 180 degrees, e.g., about 234 degrees.

Once the driven pulleys 216 and 218 come to a stop, the frictional engagement of the belt(s) 204 with the driven pulleys is generally reduced. That is, once the driven pulleys become relatively static, the belt(s) may loosen such that they no longer provide braking force to the driven pulleys 216 and 218.

The present invention provides a belt drive system that takes advantage of the pivotal movement of the idler pulley, used for drive system engagement and disengagement, to also accomplish a dynamic braking function. By combining these functions, a separate brake actuation mechanism is not required. Moreover, systems and methods in accordance with embodiments of the present invention allow a single brake mechanism to stop multiple driven shafts (e.g., jackshafts). Thus, potential costs savings and reduced maintenance requirements may result over comparable systems utilizing separate, multiple brake systems.

The complete disclosure of the patents, patent documents, and publications cited in the Background, the Detailed Description of Exemplary Embodiments, and elsewhere herein are incorporated by reference in their entirety as if each were individually incorporated.

Illustrative embodiments of this invention are discussed and reference has been made to possible variations within the scope of this invention. These and other variations and modifications in the invention will be apparent to those skilled in the art without departing from the scope of the invention, and it should be understood that this invention is not limited to the illustrative embodiments set forth herein. Accordingly, the invention is to be limited only by the claims provided below, and equivalents thereof.

What is claimed is:

1. A drive system, comprising:
   a driving pulley;
   a driven pulley;
   an endless belt partially surrounding both the driving pulley and the driven pulley; and
   an idler pulley located proximate the belt between the driving pulley and the driven pulley and selectively movable between: a first position, wherein the idler pulley contacts the belt and tensions it sufficiently to ensure power transmission between the driving pulley and the driven pulley; and a second position, wherein the idler pulley contacts a stationary brake member and both relaxes a first portion of the belt located near the driving pulley and tensions a second portion of the belt located between the idler pulley and the driven pulley, whereby the idler pulley, when in the second position, has sufficient frictional engagement with the second portion of the belt to provide a braking force to the driven pulley.

2. The system of claim 1, wherein the brake member is a band brake comprising a braking surface that corresponds in shape to a friction surface of the idler pulley.

3. The system of claim 2, wherein the idler pulley pivots about an idler pivot axis between the first position and the second position, and further wherein a first end of the band brake is attached about the idler pivot axis.

4. The system of claim 1, wherein the driven pulley comprises a jackshaft coupled to a lawn mower cutting deck.

5. The system of claim 1, wherein the driven pulley comprises a jackshaft coupled to a blower.

6. A drive system for use with a vehicle, the system comprising:
   a powered driving pulley;
   at least one driven pulley operatively attached to an implement supported by the vehicle;
   an endless belt operable to contact portions of both the driving pulley and the at least one driven pulley; and
   an idler pulley positioned proximate the belt between the driving pulley and the at least one driven pulley, the idler pulley selectively movable between a first position and a second position, wherein, when in the first position, the idler pulley tensions the belt to ensure transmission of power between the driving pulley and the at least one driven pulley, and, when in the second position, contacts a stationary brake member and both relaxes a first portion of the belt located near the driving pulley and tensions a second portion of the belt located between the idler pulley and the at least one driven pulley, whereby the idler pulley, when in the second position, has sufficient frictional engagement with the second portion of the belt to provide a braking force to the at least one driven pulley.

7. The system of claim 6, wherein the idler pulley pivots about an idler pivot axis between the first position and the second position, and further wherein a first end of the brake member is attached about the idler pivot axis.

8. The system of claim 6, wherein the powered driving pulley is directly attached to a driveshaft of an engine.

9. The system of claim 6, wherein the at least one driven pulley comprises:
   a first driven pulley operatively attached to a cutting deck; and
   a second driven pulley operatively attached to a blower associated with the cutting deck.

10. The system of claim 9, wherein the belt engages the first driven pulley over an arc of engagement of more than 180 degrees.

11. The system of claim 9, wherein the belt engages the second driven pulley over an arc of engagement of more than 180 degrees.

12. The system of claim 6, wherein the idler pulley is movable between the first position and the second position via a mechanical linkage.

13. A drive system for use with a lawn mower, the system comprising:
   a driving pulley coupled to an engine;
   a driven pulley coupled to a jackshaft;
   at least one endless belt operable to contact both the driving pulley and the driven pulley; and
   an idler pulley located between the driving pulley and the driven pulley and selectively movable between: a first position, wherein the idler pulley contacts and tensions the belt; and a second position, wherein the idler pulley contacts a stationary band brake and both relaxes a first portion of the belt located near the driving pulley and tensions a second portion of the belt located between the idler pulley and the driven pulley, whereby the idler pulley, when in the second position, has sufficient frictional engagement with the second portion of the belt to provide a braking force to the driven pulley.

14. The system of claim 13, wherein the idler pulley pivots about an idler pivot axis between the first position and the second position, and further wherein a first end of the band brake is attached about the idler pivot axis.

15. The system of claim 13, wherein the at least one endless belt comprises: a first endless belt; and a second endless belt operating next to the first endless belt.

16. The system of claim 15, wherein each of the first endless belt and the second endless belt comprises a double-sided V belt.

* * * * *